United States Patent

[11] 3,582,103

| [72] | Inventor | Arnt L. Schoning<br>18 Town Landing Road, Falmouth Foreside, Maine |
|---|---|---|
| [21] | Appl. No. | 857,052 |
| [22] | Filed | Sept. 11, 1969 |
| [45] | Patented | June 1, 1971 |

[54] DOLLY FOR USE IN CHANGING VEHICLE WHEELS
6 Claims, 3 Drawing Figs.

[52] U.S. Cl. .................................................... 280/79.1, 314/331
[51] Int. Cl. .................................................... B62b 5/00
[50] Field of Search ........................................ 280/79.1, 79.2; 214/330, 331, 332, 333

[56] References Cited
UNITED STATES PATENTS
| 1,964,119 | 6/1934 | Hendy | 214/331 |
| 2,644,597 | 7/1953 | Lewis | 214/331 |
| 2,807,380 | 9/1957 | Boehnke | 214/332 |
| 3,173,708 | 3/1965 | Machielse | 280/79.1 |

*Primary Examiner*—Kenneth H. Betts
*Assistant Examiner*—Robert R. Song
*Attorney*—Abbott Spear ABSTRACT: A dolly is disclosed for use in changing vehicles wheels, the dolly consisting of a bed supported by casters and having a fixed, transverse wall. A second wall is supported by the bed for movement towards and away from the fixed wall and adjustable means are provided for moving the second wall into and out of a position clamping side portions of the tire adjacent the bed against the fixed wall, the casters supporting the bed close to the ground to enable the dolly to be pushed against the hub of a vehicle jacked up for wheel replacement.

PATENTED JUN 1 1971 3,582,103

INVENTOR
ARNT L. SCHONING
BY
ATTORNEY

DOLLY FOR USE IN CHANGING VEHICLE WHEELS

The present invention relates to dollys for use in changing vehicle wheels.

Changing wheels in the event of a flat tire is a task with which almost everyone is familiar. The removal of a wheel is not particularly strenuous work but the act of securing the replacement wheel is quite another matter; notably in the lifting of the replacement wheel and turning it so that is stud-receiving holes will receive the wheel-supporting studs of the hub while the held wheel is pushed in place against the hub. Dollys that could be used in securing wheels to motor vehicles have been proposed. These were not adapted for passenger car used because the manner in which the wheels were attached thereto made them difficult to to use and wholly unfitted for passenger car uses because of their limited storage space.

The principal objective of the present invention is to make it possible to avoid the risk of overexertion in changing wheels, an objective attained by providing a dolly free of the objectionable features of earlier proposals. A wheel-supporting dolly in accordance with the invention has a wheel-supporting bed mounted on casters and including a fixed transverse wall. A second wall is slidably supported by the bed and is connected thereto by adjustable means operable to bring the second wall into and out of a position clamping portions of the tire adjacent the bed against the fixed wall. The casters support the bed sufficiently close to the ground so that the attached replacement wheel may be pushed in place against the hub from which the wheel has been removed without the necessity of lifting it. Manipulation of the jack may be necessary to bring the hub to the right height and, if the wheel has not been properly oriented in relation to the studs of the hub, it may be necessary to turn it slightly while supported by the dolly.

Another important objective of the invention, made possible by the gripping of the tire of the supported wheel adjacent the bed and by the adjustable connecting means for the second wall, is to have the dolly of a lightweight, low-cost construction dimensioned for storage with the spare wheel in a motor vehicle, particularly of any passenger type, without any substantial reduction in the storage space for other articles.

In the accompanying drawings, there is shown an embodiment of the invention illustrative of these and other of its objectives, novel features, and advantages.

Figure 1:
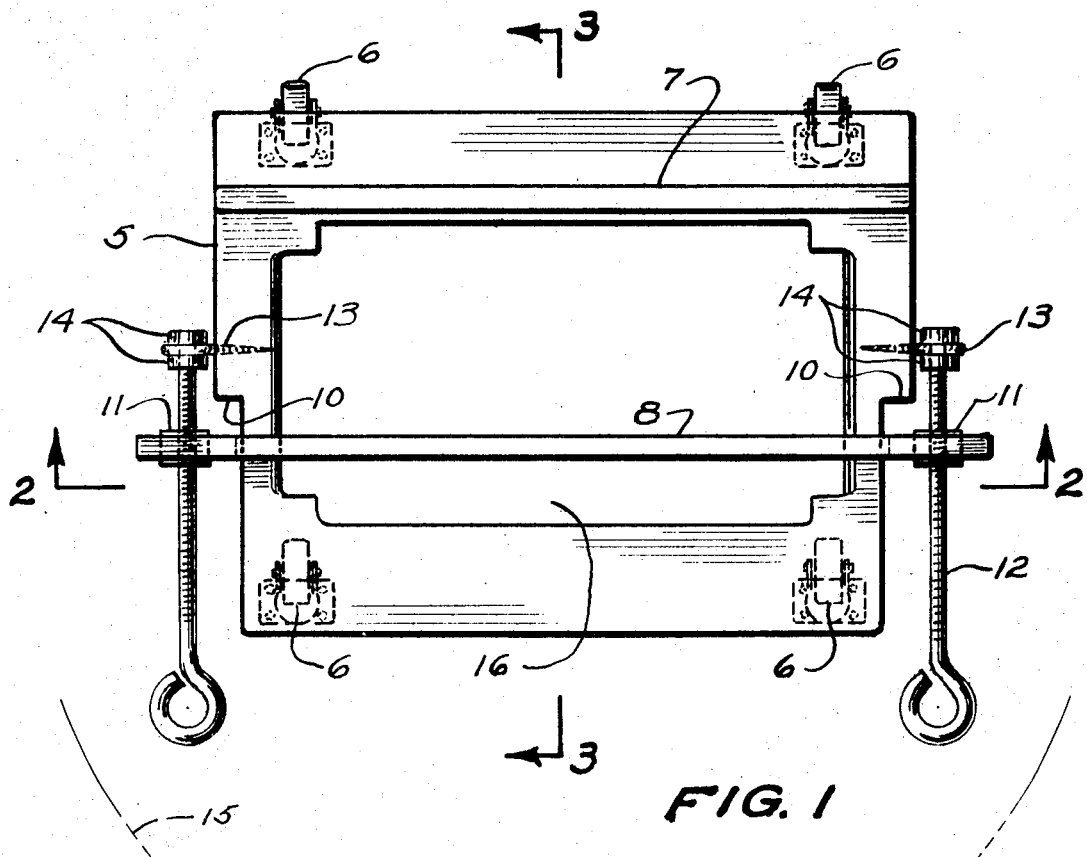
FIG. 1 is a top plan view of a dolly in accordance with the invention.
Figure 2:
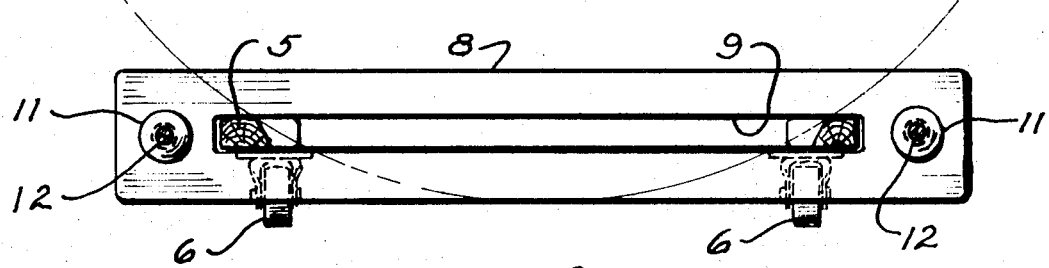
FIG. 2 is a section taken approximately along the indicated lines 2-2 of FIG. 1.
Figure 3:
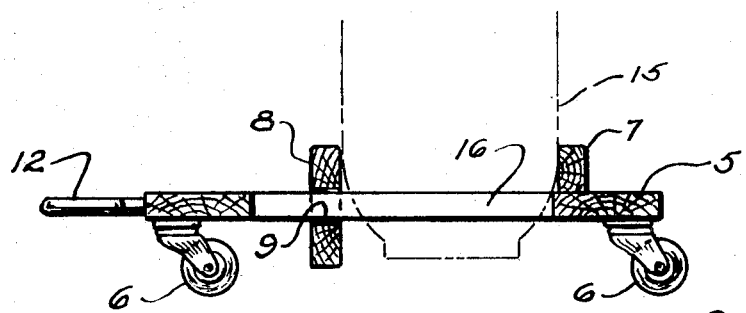
FIG. 3 is a section taken approximately along the indicated lines 3-3 of FIG. 1.

The wheel-supporting dolly shown in the drawings has a flat, substantially rectangular bed 5 provided with supporting casters 6 adjacent its corners and these may be of any desired type. The bed 5 includes a transverse, rear wall 7 adjacent its rear edge.

A second front wall 8 is shown as having a lengthwise slot 9 dimensioned to receive within it, before the casters 6 at the front of the dolly are installed, the front portion of the bed 5 thus to slidably mount the second wall 8 on the bed 5. The sides of the bed 5 have laterally projecting shoulders 10 engageable by the ends of the second wall 8 and function as stops to limit the extent to which the second wall may be slid towards the front wall 7.

Each projecting end of the second wall 8 is provided with a fixed nut 11 through which extends an adjusting member 12, shown as an eyebolt, with the end of its threaded portion held captive in an eyebolt 13 by retainers 14, each eyebolt 13 projecting laterally of the bed 5 below the upper surface thereof and between the front wall 7 and the stop shoulders 10.

With the dolly as thus far described, and in the case of a flat tire, the vehicle is jacked up and the appropriate wheel removed from its hub in the usual manner. The hub is not shown as the construction of motor vehicle hubs is well known. Where possible, the hub is turned so that one wheel-supporting stud is in the 12 o'clock position. The spare wheel, indicated at 15, is removed from its place of storage in the vehicle and placed on the dolly in the trough established by the walls 7 and 8, desirable with a stud-receiving hole in the 12 o'clock position or, in case the wheel hub cannot be turned to place a stud in that position, then in the appropriate position to ensure that the stud-receiving holes of the wheel 15 will register with the studs of the hub or can later be brought into registry with minimum effort. The eyebolts 12 are then turned until the wheel 15 is securely attached to the dolly which may then be easily pushed to bring the wheel 15 against the exposed hub. If the wheel 15 has been properly positioned on the dolly and the hub is at the appropriate height, the studs of the hub pass through the stud-receiving holes of the wheel 15 as it is pushed in place so that it is only necessary to properly attach and set up the wheel-retaining nuts. Should the holes not be in registry with the studs, the hub may be raised by means of the jack or the holding pressure applied by the second or front wall 8 eased sufficiently to permit the wheel 15 to be turned, in either case the strain involved in lifting the wheel 15 being avoided. The dolly may then be slid sidewise from under the wheel 15 and stored in the trunk or elsewhere in the vehicle.

It will be appreciated from the foregoing that the dolly is light in weight and adapted to be manufactured at an appropriately low cost. In addition, it is sufficiently small in size as to be easily and conveniently stored with the spare wheel. In practice, the casters 6 support the bed 5 close to the ground and the bed 5 is provided with a central opening 16 adjacent the rear wall 7 and shaped and dimensioned to receive a portion of the tire without permitting its contact with the ground. When the bed 5 of the dolly is provided with a central opening 16, it is necessary to jack up the vehicle a short distance after the wheel 15 has been secured in place in order to permit the dolly to be removed.

While the invention is herein discussed primarily in connection with passenger car uses, dollys in accordance with the invention of different sizes may be used advantageously with truck or other large tires and wheels.

I claim:

1. A wheel-supporting dolly comprising a bed, rotatable supporting members attached to said bed, said bed including a transverse wall, a second wall supported by said bed parallel to said first named wall for movement towards and away from said first wall, adjustable means connecting the second wall to said bed and operable to effect such movements to an extent such that a wheel positioned on said dolly can be clamped thereto in an upright position between said walls while a wheel is being replaced on or removed from a vehicle wherein the ends of the second wall project beyond the sides of the dolly with portions extending below the upper surface thereof and the adjustable means connecting the second wall to the bed are secured to the sides of the bed and to the projecting ends of the second wall, said walls being engageable with side portions of a wheel tire adjacent the upper surface of the bed, and said rotatable members supporting said bed sufficiently close to the ground to enable said dolly to be rolled into wheel-changing position under the hub of a vehicle that has been jacked for wheel replacement.

2. The dolly of claim 1 in which the bed has a central opening between the walls dimensioned to receive the bottom portion of a tire of a supported wheel but with the tire held out of contact with the ground.

3. The dolly of claim 1 and stop means engageable by the second wall to limit the extent to which it may be advanced towards the first-named wall.

4. The dolly of claim 1 in which the connecting means are nuts, one fixed on each projecting end of the second wall below the upper surface of the bed and threaded members, one extending along each side of the bed and through the appropriate nut with means on each side between the walls rotatably holding the members captive.

5. The dolly of claim 4 in which the second wall has a central transverse slot through which the bed extends.

6. The dolly of claim 5 in which the bed has laterally projecting shoulders engageable by the projecting ends of the second wall and located between the first-named wall and the means holding the threaded members captive.